Figure 1:
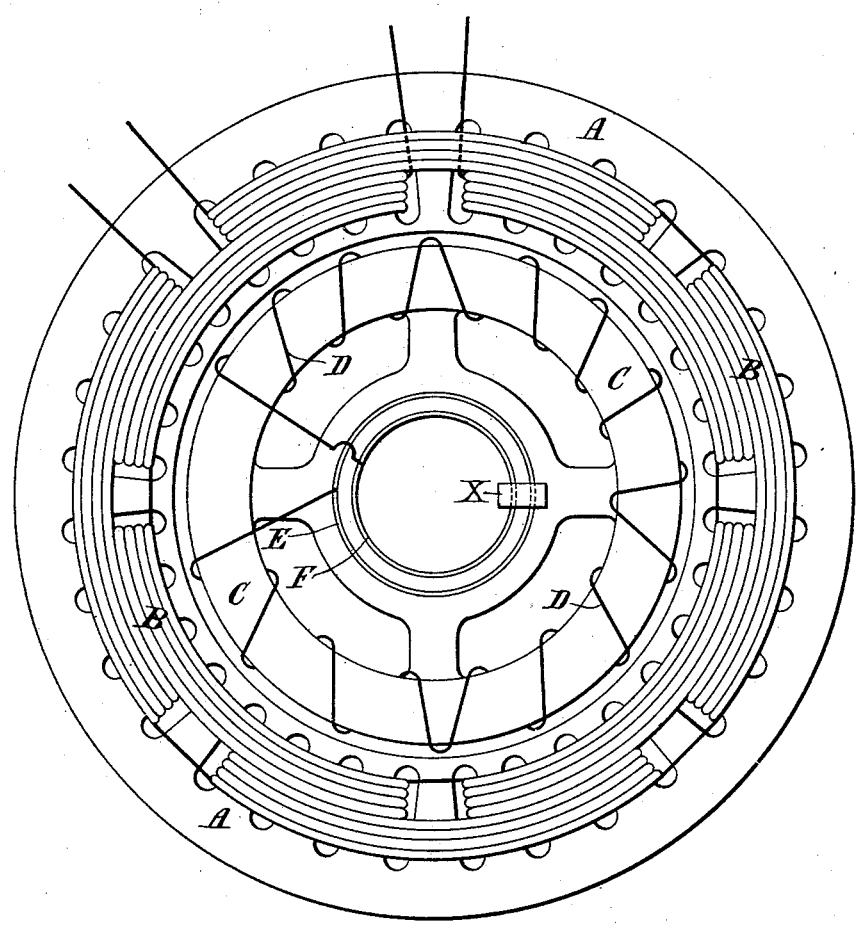

No. 735,118. PATENTED AUG. 4, 1903.
W. LANGDON-DAVIES & A. SOAMES.
POLYPHASE ALTERNATING CURRENT INDUCTION MOTOR.
APPLICATION FILED JUNE 9, 1902.
NO MODEL. 2 SHEETS—SHEET 1.

Witnesses
A. M. Parkins.
Q. Ellsworth

Inventors
Walter Langdon-Davies
and Alfred Soames,
By their Attorneys,
Baldwin, Davidson Wight

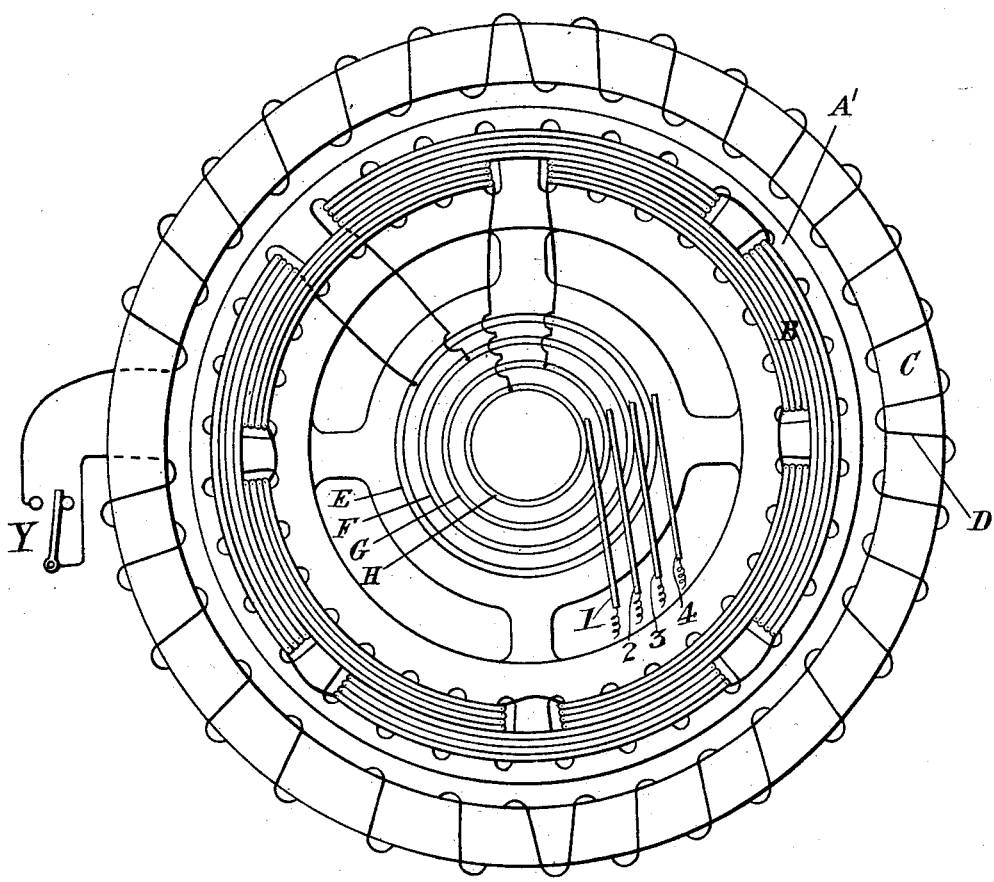

No. 735,118. Patented August 4, 1903.

UNITED STATES PATENT OFFICE.

WALTER LANGDON-DAVIES AND ALFRED SOAMES, OF SURREY, ENGLAND.

POLYPHASE ALTERNATING-CURRENT INDUCTION-MOTOR.

SPECIFICATION forming part of Letters Patent No. 735,118, dated August 4, 1903.

Application filed June 9, 1902. Serial No. 110,937. (No model.)

*To all whom it may concern:*

Be it known that we, WALTER LANGDON-DAVIES and ALFRED SOAMES, electricians, subjects of the King of Great Britain, both residing at 101 Southwark street, in the county of Surrey, England, have invented certain new and useful Improvements in Polyphase Alternating - Current Induction - Motors, of which the following is a specification.

According to this invention we so construct polyphase alternating-current induction-motors that the motor may be started and brought to about full speed without using any winding on the induced member and that then a circuit may be completed through a winding on the induced member in order that the motor may work with efficiency when running at this speed. To effect this, we make the body of the induced member, which may be either the fixed or the rotary part, of solid metal, such as cast or wrought iron or steel, of sufficient thickness to afford a path of high resistance for Foucault currents set up within it, and the windings carried by the body of such induced member we make of high conductivity, so that when the circuit is completed through such windings slip is reduced, and therefore the current flowing in the solid body is also reduced and the motor enabled to work efficiently when performing work. We have found that by constructing the induced member of polyphase alternating-current induction-motors in this way very little heat is generated in the solid body of the induced member when running at full speed owing to there being at this time very little change of magnetism in it.

Figure 1 is a diagrammatic view of a motor thus formed in which the rotor is the induced member; Fig. 2, a similar view of a motor in which the stator is the induced member, and Fig. 3 shows how the body of the induced member may be divided.

In Fig. 1, A is a fixed field-magnet ring; B, the field-magnet windings; C, a solid rotor of cast or wrought iron or steel; D, the inductive winding of the rotor, and E and F are slip-rings insulated from one another, to which the ends of the rotor-winding are coupled and by connecting which (as, for instance, by a contact-block X) a circuit may be completed through the rotor-winding. The rotor may be wound either with a ring or drum winding, either single or multiphase.

In Fig. 2, A' is the field-magnet ring, which in this case forms the rotor. B represents the field-magnet windings. C is a solid stator of cast or wrought iron or steel; D, the inductive winding of the stator, and E F G H are slip-rings insulated from one another, to which the ends of the field-magnet windings of the rotor are connected. The stator may be wound either with a ring or drum winding, either single or multiphase. The terminals of the winding D may be connected to any suitable switch, as Y. 1 2 3 4, Fig. 2, show conductors or brushes for supplying current to the rings E, F, G, and H.

The solid metal of which the body of the induced member of either form of motor is formed may either be in one single piece, or if the induced member is broad, and would if made in one piece offer too little resistance to the flow of induced currents within it, it might be divided into two or more parts at right angles to the direction of the induced currents and the parts be wholly or partially insulated from one another to increase the resistance to the flow of induced currents. For example, in a small motor in which the induced member is the rotor and the rotor is about six inches in diameter and three inches wide we have found that it may with advantage be divided into three parts at right angles to the axis, as illustrated in Fig. 3.

What we claim is—

1. A polyphase alternating-current induction-motor in which the body of the induced member is constructed to offer a path of comparatively high resistance to currents induced within it and carries a winding of high conductivity the circuit through which can be broken at starting and completed when the motor has been run up to about full speed.

2. In a polyphase alternating-current induction-motor, the combination with the field-magnet ring, of the induced member having a body of solid iron or steel constructed to offer a path of comparatively high resistance to currents induced within it, a winding of high conductivity and means for opening and closing the circuit of said winding so that said circuit may be broken at starting and thereafter completed.

WALTER LANGDON-DAVIES.
ALFRED SOAMES.

Witnesses:
WILFRED CARPMAEL,
JOHN H. WHITEHEAD.